(12) United States Patent
Evans et al.

(10) Patent No.: US 8,181,707 B2
(45) Date of Patent: May 22, 2012

(54) APPARATUS AND METHODS TO PROTECT CONNECTIONS

(75) Inventors: Merle E. Evans, Spring, TX (US); John Richard Setterberg, Jr., Huntsville, TX (US); Lev Ring, Houston, TX (US); Ghazi J. Hashem, Houston, TX (US); Richard W. DeLange, Kingwood, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 12/886,307

(22) Filed: Sep. 20, 2010

(65) Prior Publication Data

US 2011/0005775 A1    Jan. 13, 2011

Related U.S. Application Data

(62) Division of application No. 11/751,841, filed on May 22, 2007, now Pat. No. 7,798,238.

(60) Provisional application No. 60/747,909, filed on May 22, 2006.

(51) Int. Cl.
*E21B 19/16* (2006.01)

(52) U.S. Cl. .......... 166/380; 166/207; 166/242.6

(58) Field of Classification Search .......... 166/380, 166/241.6, 242.6, 207
See application file for complete search history.

(56) References Cited

U.S. PATENT DOCUMENTS

| | | | |
|---|---|---|---|
| 3,869,150 A | 3/1975 | Brown | |
| 5,954,374 A | 9/1999 | Gallagher et al. | |
| 6,409,175 B1 | 6/2002 | Evans et al. | |
| 7,140,446 B2 | 11/2006 | Metcalfe | |
| 7,422,068 B2 | 9/2008 | Lynde | |
| 7,452,007 B2 | 11/2008 | Hashem et al. | |
| 7,581,766 B2 | 9/2009 | Verger et al. | |
| 7,798,238 B2 | 9/2010 | Evans et al. | |
| 2004/0055758 A1 | 3/2004 | Brezinski et al. | |
| 2005/0087983 A1 | 4/2005 | Verger et al. | |
| 2005/0127671 A1 | 6/2005 | Ellington et al. | |
| 2005/0150654 A1* | 7/2005 | Kirk et al. ............ | 166/206 |
| 2006/0006647 A1 | 1/2006 | Hashem et al. | |
| 2006/0162937 A1 | 7/2006 | Costa et al. | |
| 2006/0208488 A1 | 9/2006 | Costa | |
| 2007/0024053 A1 | 2/2007 | Sivley, IV et al. | |
| 2007/0074868 A1 | 4/2007 | Slack et al. | |
| 2007/0164565 A1 | 7/2007 | Evans et al. | |
| 2008/0283253 A1* | 11/2008 | Buytaert et al. ............ | 166/381 |

FOREIGN PATENT DOCUMENTS

| | | |
|---|---|---|
| FR | 2 844 330 | 3/2004 |
| GB | 2 415 974 | 1/2006 |
| WO | WO97/21901 | 6/1997 |
| WO | WO01/04535 | 1/2001 |

(Continued)

*Primary Examiner* — Hoang Dang
(74) *Attorney, Agent, or Firm* — Patterson & Sheridan, LLP

(57) ABSTRACT

The present invention generally relates to a method and apparatus for protecting tubular connections. In one aspect, an expandable tubular connection for use in a wellbore is provided. The tubular connection includes a tubular pin member. The tubular connection also includes a tubular box member having an end portion, wherein the tubular pin member is matable with the tubular box member to form the tubular connection. Additionally, the tubular connection includes a sleeve member disposed on the tubular pin member, wherein the sleeve member is configured to substantially protect the end portion of the tubular box member as the tubular connection is lowered into the wellbore. In yet a further aspect, a method for utilizing a tubular connection in a wellbore is provided.

26 Claims, 5 Drawing Sheets

FOREIGN PATENT DOCUMENTS

| | | |
|---|---|---|
| WO | WO03/032331 | 4/2003 |
| WO | WO03/086675 | 10/2003 |
| WO | WO03/089161 | 10/2003 |
| WO | WO2004/009950 | 1/2004 |
| WO | WO2004/010039 | 1/2004 |
| WO | WO2004/074622 | 9/2004 |
| WO | WO2007/071624 | 6/2007 |

* cited by examiner

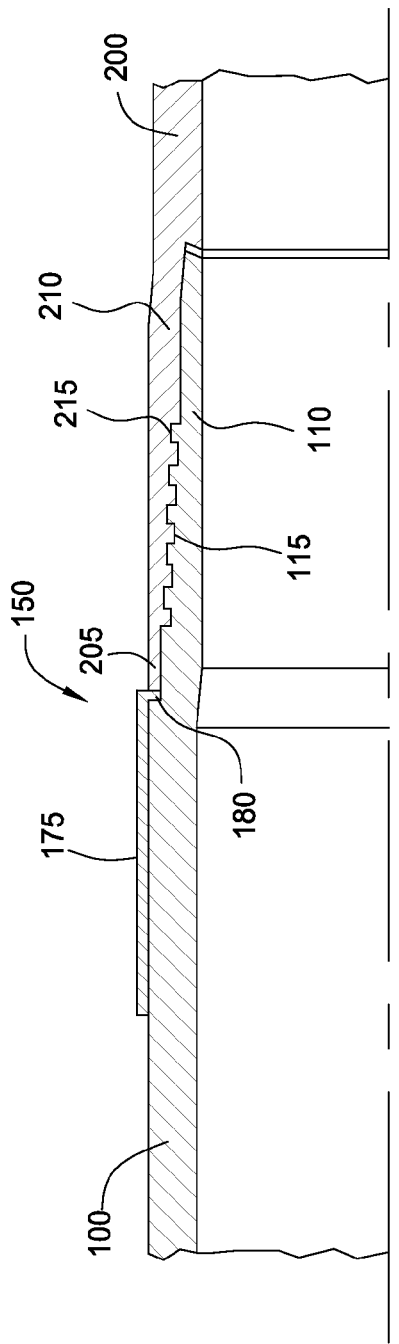
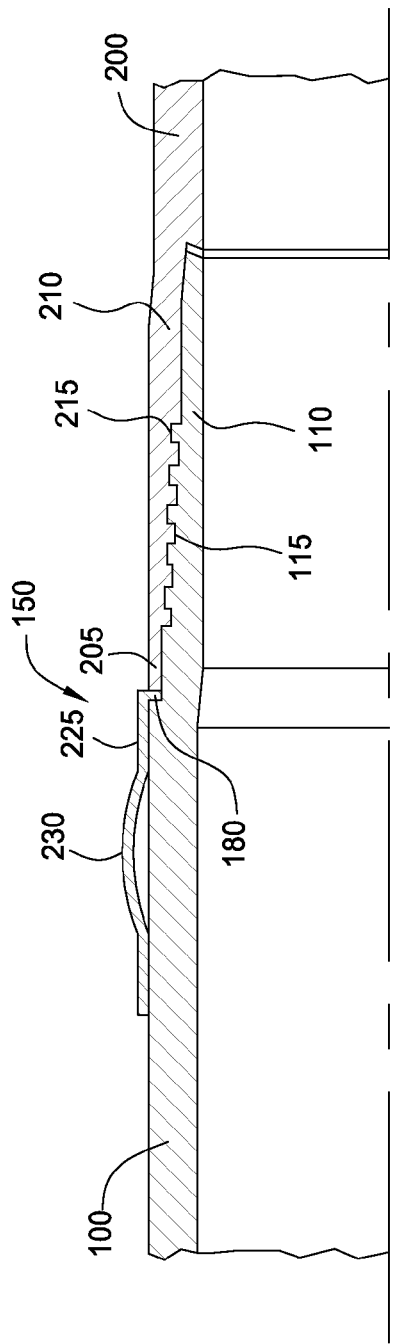
FIG. 2
FIG. 3

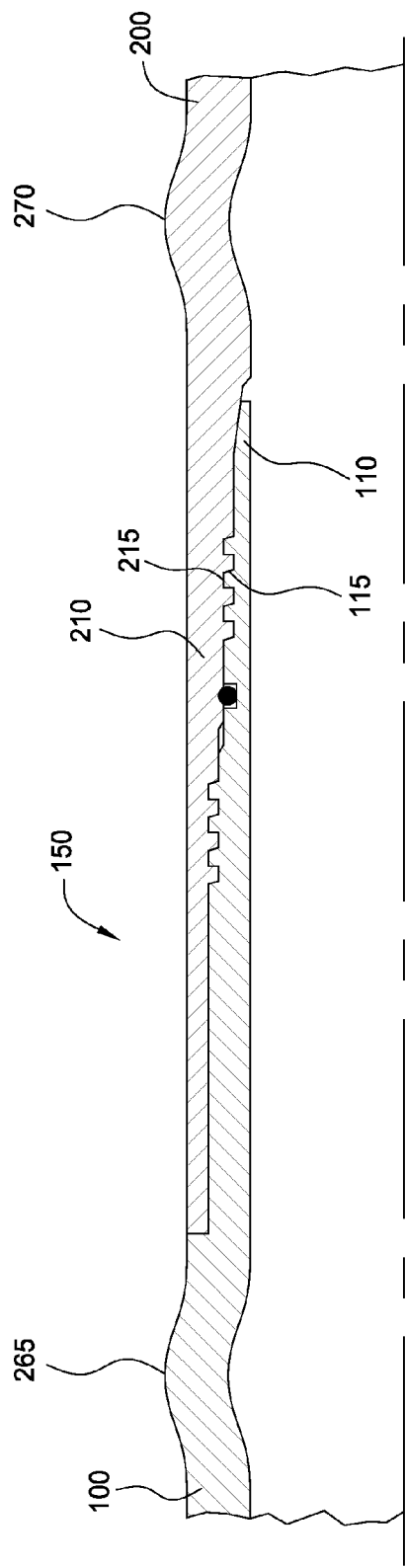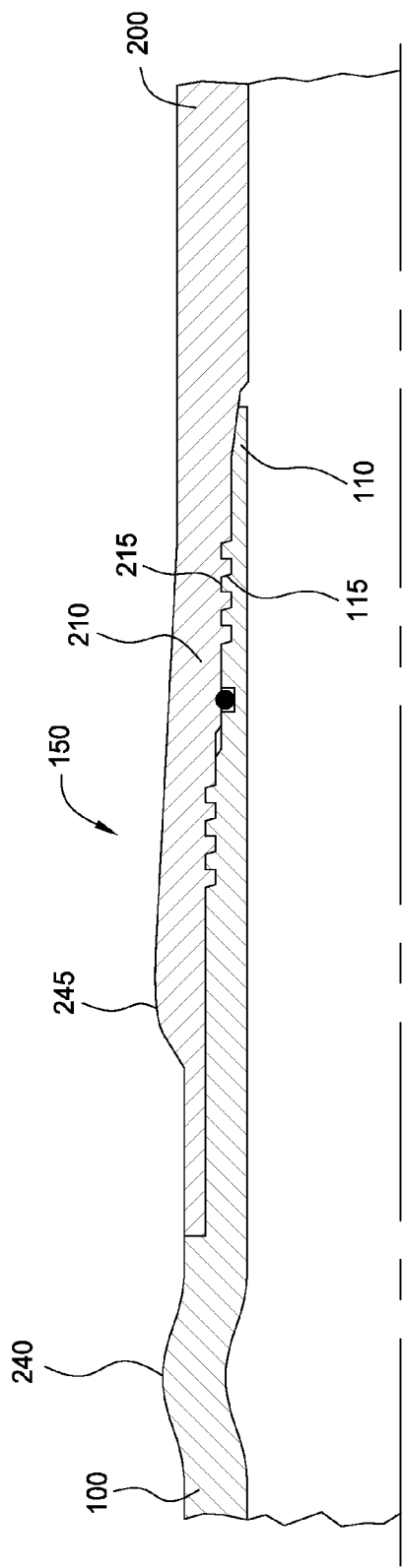

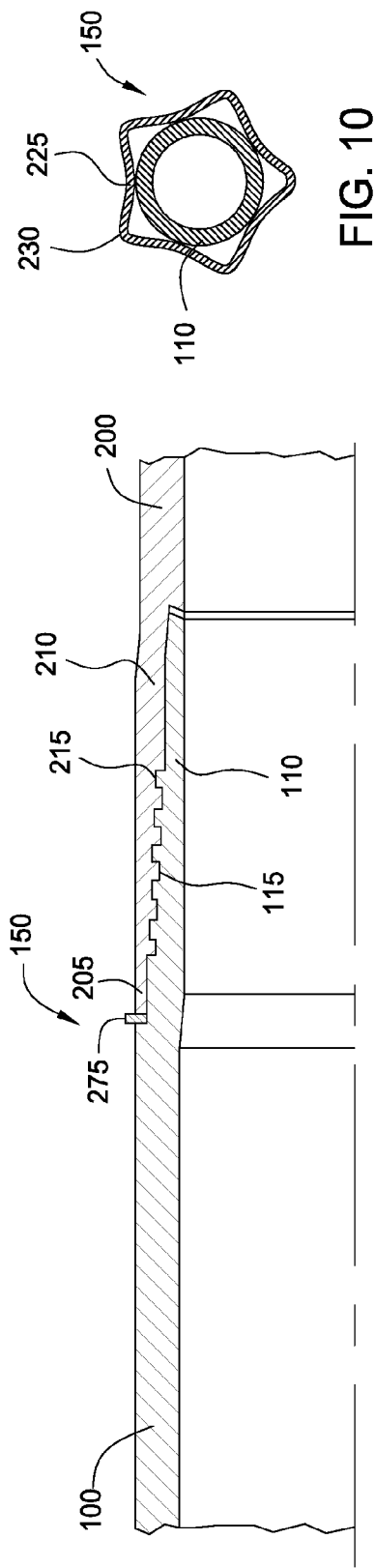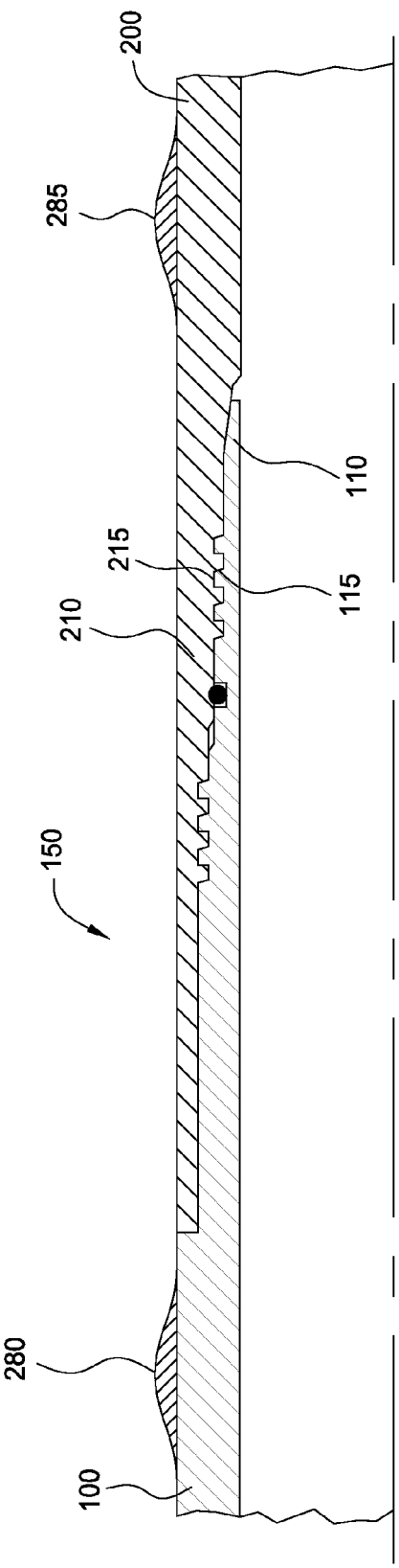

APPARATUS AND METHODS TO PROTECT CONNECTIONS

CROSS-REFERENCE TO RELATED APPLICATIONS

This application is a divisional of co-pending U.S. patent application Ser. No. 11/751,841 filed May 22, 2007, now issued as U.S. Pat. No. 7,798,238, on Sep. 21, 2010, which claims benefit of U.S. provisional patent application Ser. No. 60/747,909 filed May 22, 2006. Each of the aforementioned related patent applications is herein incorporated by reference in its entirety.

BACKGROUND OF THE INVENTION

1. Field of the Invention

Embodiments of the present invention generally relate to wellbore completion, and more particularly, to tubular connections.

2. Description of the Related Art

In order to access hydrocarbons in subsurface formations, it is typically necessary to drill a borehole into the earth. The process of drilling a borehole and of subsequently completing the borehole in order to form a wellbore requires the use of various tubular strings. These tubulars are run downhole where the mechanical and seal integrity of the jointed connections are critically important.

Generally, male to female threaded connections connect multiple tubular members end-to-end. The male end is referred to as a pin and the female end as a box. The tubulars are connected, or "made-up," by transmitting torque against one of the tubulars while the other tubular is typically held stationary. Transmitting torque in a single direction corresponding with connection make-up tightens the threaded joint in order to establish the seal integrity and lock in the applied torque.

When running tubulars, there is sometimes a requirement to run jointed tubulars that will later be expanded by various types of expansion mechanisms. The basic type of expander tool employs a cone-shaped body, which is run into a wellbore at the bottom of the casing that is to be expanded. The expander tool is then forced upward in the wellbore by both pulling on the working string from the surface and applying pressure below the cone. Pulling the expanded conical tool has the effect of expanding a portion of a tubular into sealed engagement with a surrounding formation wall, thereby sealing off the annular region therebetween. More recently, rotary expander tools have been developed. Rotary expander tools employ one or more rows of compliant rollers that are urged radially outwardly from a body of the expander tool in order to engage and to expand the surrounding tubular. The expander tool is rotated downhole so that the actuated rollers can act against the inner surface of the tubular to be expanded in order to expand the tubular body circumferentially. Radial expander tools are described in U.S. Pat. No. 6,457,532, issued to Simpson et al., which is incorporated herein by reference in its entirety.

One problem that may occur during a completion operation is that the tubular string may get scratched when the tubular string contacts a portion of the wellbore when the tubular string is lowered into the wellbore. Normally, a scratch on a tubular does not affect the integrity of the tubular. However, a scratch on a tubular connection between the tubulars may be problematic. For instance, if the scratch occurs on the box portion of the tubular connection near the thin face of the box, then the box portion may split apart when the tubular connection is expanded. As such, the structural integrity of the entire tubular connection may be compromised.

Therefore, a need exists for an apparatus and a method to protect expandable tubular connections, thereby maintaining the mechanical and/or sealing integrity of the connection.

SUMMARY OF THE INVENTION

The present invention generally relates to a method and apparatus for protecting tubular connections. In one aspect, an expandable tubular connection for use in a wellbore is provided. The tubular connection includes a tubular pin member. The tubular connection also includes a tubular box member having an end portion, wherein the tubular pin member is matable with the tubular box member to form the tubular connection. Additionally, the tubular connection includes a sleeve member disposed on the tubular pin member, wherein the sleeve member is configured to substantially protect the end portion of the tubular box member as the tubular connection is lowered into the wellbore.

In a further aspect, an expandable tubular connection for use in a wellbore is provided. The connection includes a tubular box member having an end portion. The connection further includes a tubular pin member having an outer diameter greater than an outer diameter of the tubular box member, wherein a portion of the tubular pin member is configured to substantially shield the end portion of the tubular box member from contact with the wellbore.

In yet a further aspect, a method for utilizing a tubular connection in a wellbore is provided. The method includes the step of positioning a sleeve member on the tubular pin member. The method also includes the step of connecting a tubular pin member with a tubular box member to provide the tubular connection. Further, the method includes the step of substantially blocking an end portion of the tubular box member from contact with the wellbore by utilizing the sleeve member as the tubular connection is lowered into the wellbore. Additionally, the method includes the step of expanding the tubular connection.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 illustrates the threaded connection with a sleeve member in accordance with the present invention.

FIG. 3 illustrates the threaded connection with a sleeve member in accordance with the present invention.

FIG. 6 illustrates the threaded connection in accordance with the present invention.

FIG. 7 illustrates the threaded connection in accordance with the present invention.

FIG. 8 illustrates the threaded connection in accordance with the present invention.

FIG. 9 illustrates the threaded connection in accordance with the present invention.

FIG. 10 illustrates a cross-section of the threaded connection in accordance with the present invention.

DETAILED DESCRIPTION

Figure 1:
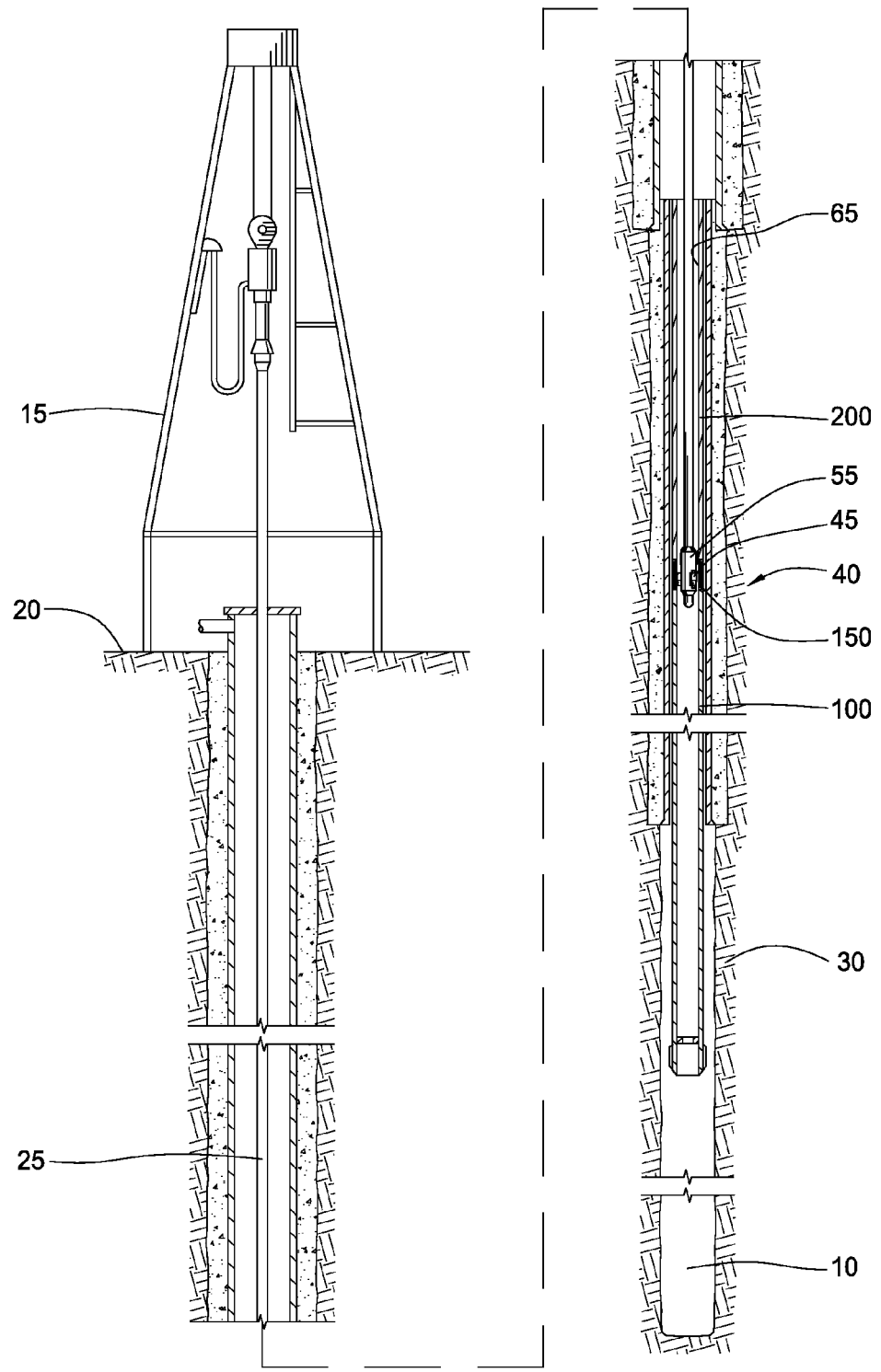
FIG. 1 illustrates a threaded connection of the present invention within a wellbore.

FIG. 1 illustrates an embodiment of the present invention in use within a wellbore 10. Visible in FIG. 1 is a representative rig 15, a ground surface 20, a formation 30, a drill string 25 (or running string), a first tubular 100, a second tubular 200, a representative expander tool 40 comprising a body 55 and an expansion member 45 (or roller), a bore 65, and a connection 150 (or joint), between the first tubular 100 and the second tubular 200. Although the representative expander tool 40 is illustrated in FIG. 1 as a rotary expander tool, it should be understood that the representative expander tool could be a cone member, a swage member, or any other expander member known in the art.

In operation, the first tubular 100 and the second tubular 200 are mated together at the surface 20 according to normal stab-in and threading procedures. The stab-in procedures can be performed with tubulars arranged in a pin up and a box down configuration or in a pin down and a box up configuration. After run-in, the tubulars can be expanded from within by any method known to those skilled in the art. The expansion process can be run in any axial and/or rotational direction within the tubulars 100, 200. For illustrative purposes, a running tool with an expander tool 40 attached thereto is run through the bore 65 of the tubulars. At a desired location, the tool 40 expands the tubulars. When the expander tool 40 reaches the connection 150 between the first tubular 100 and the second tubular 200, an internal wall of the pin portion of the first tubular 100 expands into an internal wall of the box portion of the second tubular 200. The connection 150 between the tubulars 100, 200 is capable of being expanded without losing its mechanical or sealing integrity.

FIG. 2 illustrates the threaded connection 150 in accordance with the present invention. The connection 150 includes a pin member 110 formed at a threaded section of the first tubular 100 and a box member 210 formed at a threaded section of the second tubular 200. As illustrated, the pin member 110 has an outer diameter greater than or equal to an outer diameter of the box member 210. In one embodiment, the threaded sections of the pin member 110 and the box member 210 are tapered. The pin member 110 includes helical threads 115 extending along its length. The box member 210 includes helical threads 215 that are shaped and sized to mate with the helical threads 115 during the make-up of the threaded connection 150. The threaded sections of the pin member 110 and the box member 210 form the connection 150 of a predetermined integrity when the pin member 110 is mated with the box member 210. Additionally, depending upon wellbore characteristics, the threads may be coated with Teflon™, an inert sealant, or other material known to those in the art for sealing purposes. The threads may be machined on plain end tubulars, tubulars with both ends formed, tubulars with one plain end and one end formed, or other connection types as typically used in the oil and gas industry. One of ordinary skill in the art can appreciate that embodiments of the present invention are not limited to only certain kinds of tubular ends or thread types.

As shown in FIG. 2, a sleeve 175 is disposed around the pin member 110 to increase the outer diameter of the pin member 110. Generally, the sleeve 175 is used to protect a portion of the connection 150 adjacent the sleeve 175, namely the box member 210. More specifically, the sleeve 175 is positioned on the pin member 110 proximate an end portion 205 of the box member 210 to substantially prevent the surrounding wellbore from contacting and/or scratching the end portion 205 of the box member 210. Typically, the end portion 205 is the thinnest part of the connection 150 and a scratch on the end portion 205 may cause the box member 210 to split apart upon expansion of the connection 150. Therefore, the sleeve 175 increases the outer diameter of the pin member 110 without adding substantial thickness to the connection 150. The sleeve 175 is configured to substantially block or shield the end portion 205 from contact with the surrounding wellbore as the tubular string is lowered into the wellbore. In the embodiment illustrated, the sleeve 175 is disposed on a non-threaded portion of the tubular 100 and therefore does not add any thickness to the threaded portion of the pin member 110 or box member 210, which upon forming the connection 150 may be the thickest portion of the connection 150. As a result, the threaded portion of the connection 150 is protected and the connection 150 may be expanded without concern about additional thickness on the threaded portion of the connection 150.

As illustrated, the sleeve 175 includes a tab 180 proximate an end thereof that fits between a shoulder of the pin member 110 and an end of the box member 210. The tab 180 is configured to hold the sleeve 175 in the position illustrated in FIG. 2. It should be understood, however, that the sleeve 175 may be secured to the connection 150 by any means known in the art, such as via an epoxy, an adhesive, a weld, or shrink fit, without departing from principles of the present invention.

The sleeve 175 may be made from any type of material that is durable yet capable of expanding, such as metal, elastomeric, plastic, or a polymeric. In one embodiment, the sleeve 175 may be made from a solid material as illustrated in FIG. 2. In another embodiment, the sleeve 175 may have slots, holes, or any other geometric shapes (not shown) formed therein. The geometric shape formed in the sleeve 175 may be used to enhance the capability of the sleeve 175 to expand radially outward and/or the geometric shape may be used to allow fluid flow past the sleeve 175. In a further embodiment, a plastic and/or an elastomer layer may be disposed on top of the sleeve 175 to further offset the connection 150 from the surrounding wellbore.

FIG. 3 illustrates the threaded connection 150 with a sleeve member 225 in accordance with the present invention. For convenience, the components in FIG. 3 that are similar to the components in FIGS. 1 and 2 will be labeled with the same number indicator. As shown, the sleeve 225 is disposed around the pin member 110 and as a result the pin member 110 has an outer diameter greater than an outer diameter of the box member 210 without adding substantial thickness to the connection 150. The sleeve 225 is positioned proximate an end portion 205 of the box member 210 to substantially prevent the surrounding wellbore from contacting and/or scratching the end portion 205. As further shown, the sleeve 225 includes a protrusion 230 formed on a portion thereof. Generally, the sleeve 225, with the protrusion 230, is used to offset the connection 150 from the surrounding wellbore. In other words, the sleeve 225 and the protrusion 230 substantially block or shield the end portion 205 from contact with the surrounding wellbore as the tubular string is lowered into the wellbore. In one embodiment, the protrusion 230 may have a uniform circumferential shape on the sleeve 225. In another embodiment, the protrusion 230 may comprise a plurality of individual projections, as illustrated in FIG. 10. This embodiment allows fluid flow to travel past the sleeve 225 between the plurality of individual projections. In a further embodiment, the ends (or a single end) may be chamfered or shaped in order to facilitate the lowering of the connection 150 into the wellbore.

The sleeve 225 may be made from any type of material that is durable yet capable of expanding, such as a metal, an elastomer, a plastic, or a polymer. The sleeve 225 may be made from a solid material as illustrated in FIG. 3. Alternatively, the sleeve 225 may have slots, holes, or any other geometric shapes (not shown) formed therein. As illustrated, the protrusion 230 is a rounded protrusion. However, the protrusion 230 may be any type of geometric shape without departing from principles of the present invention.

As illustrated, the sleeve 225 includes a tab 180 proximate an end thereof that fits between a shoulder of the pin member 110 and an end of the box member 210. The tab 180 is configured to hold the sleeve 225 in the position illustrated in FIG. 3. It should be understood, however, that the sleeve 225 may be held in the position illustrated in FIG. 3 by any means know in the art without departing from principles of the present invention.

As shown in FIG. 3, the sleeve 225 is located on the pin member 110. In another embodiment, the sleeve 225 could be located on the box member 210 without departing from the principles of the present invention. In this embodiment, the sleeve 225 would be used to substantially block or shield the end portion 205 from contact with the surrounding wellbore as the tubular string is lowered into the wellbore.

Figure 4:
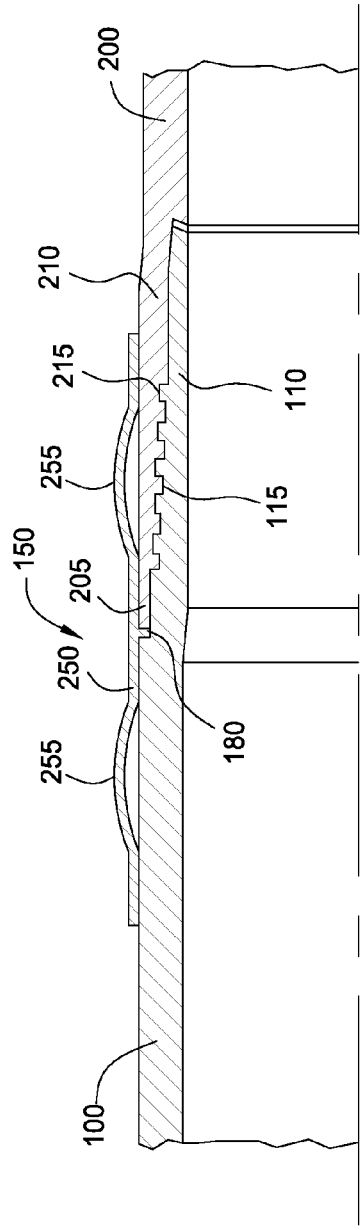
FIG. 4 illustrates the threaded connection with a sleeve member in accordance with the present invention.

FIG. 4 illustrates the threaded connection 150 with a sleeve member 250 in accordance with the present invention. For convenience, the components in FIG. 4 that are similar to the components in FIGS. 1 and 2 will be labeled with the same number indicator. As shown, the sleeve 250 is disposed around the pin member 110 and the box member 210 to substantially prevent the surrounding wellbore from contacting and/or scratching a portion of the connection 150. As further shown, the sleeve 250 includes a plurality of protrusions 255 formed on a portion of the sleeve 250. Generally, the sleeve 250, with the protrusions 255, is used to offset the connection 150 from the surrounding wellbore without adding substantial thickness to the connection 150. In other words, the sleeve 250 and the protrusions 255 substantially block or shield the end portion 205 from contact with the surrounding wellbore as the tubular string is lowered into the wellbore. The sleeve 250 may be made from any type of material that is durable yet capable of expanding, such as a metal, an elastomer, a plastic, or a polymer. The sleeve 250 may be made from a solid material as illustrated in FIG. 3. Alternatively, the sleeve 250 may have slots, holes, or any other geometric shapes (not shown) formed therein. As shown, the protrusions 255 are rounded protrusions. However, the protrusions 255 may be any type of geometric shape without departing from principles of the present invention.

As illustrated, the sleeve 250 includes a tab 180 that fits between a shoulder of the pin member 110 and an end of the box member 210. The tab 180 is configured to hold the sleeve 250 in the position illustrated in FIG. 4. It should be understood, however, that the sleeve 250 may be held in the position illustrated in FIG. 4 by any means know in the art without departing from principles of the present invention.

Figure 5:
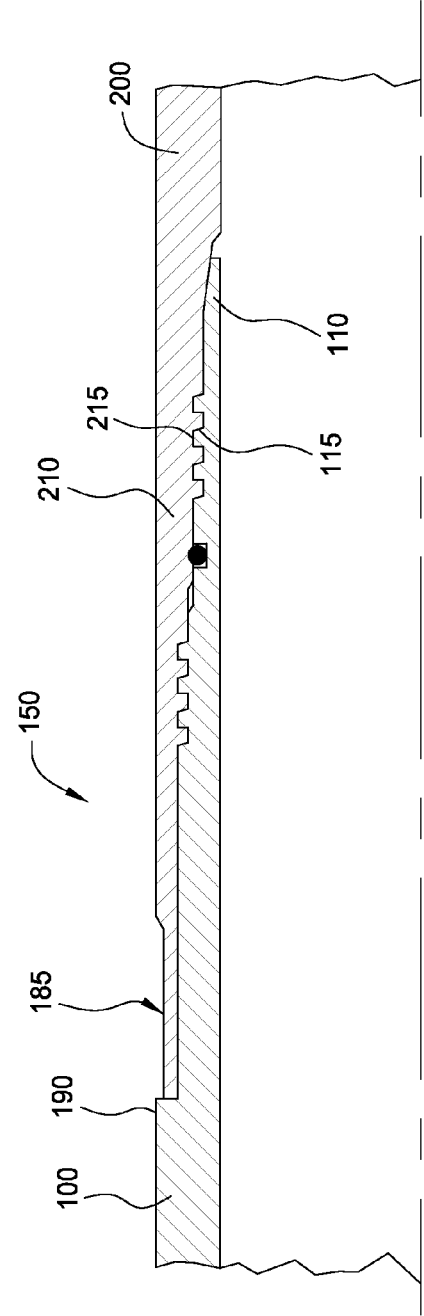
FIG. 5 illustrates the threaded connection in accordance with the present invention.

FIG. 5 illustrates the threaded connection 150 in accordance with the present invention. For convenience, the components in FIG. 5 that are similar to the components in FIGS. 1 and 2 will be labeled with the same number indicator. As shown, the box member 210 includes a portion 185 that is recessed below a shoulder portion 190 of the pin member 110, and as a result a portion of the pin member 110 has an outer diameter greater than an outer diameter of a portion of the box member 210 without adding substantial thickness to the connection 150. As shown in FIG. 5, the portion 185 is a flat surface. It should be noted, however, that the portion 185 could be a long taper or in any geometrical configuration known in the art. The shoulder portion 190 provides a means to substantially prevent the surrounding wellbore from contacting and/or scratching an end of the box member 210. As previously discussed, the end of the box member 210 is typically the thinnest portion of the connection 150 and a scratch on the end of the box member 210 may cause the box member 210 to split apart upon expansion of the connection 150, thereby compromising the structural integrity of the connection 150. Therefore, the portion 185 is recessed below the shoulder portion 190 to allow the shoulder portion 190 to substantially block or shield the vulnerable end of the box member 210 from contact with the surrounding wellbore as the tubular string is lowered into the wellbore. In another embodiment, a portion of the pin member 110 has a predetermined slope, thereby causing the pin member 110 proximate the shoulder portion 190 to have a greater outer diameter than an outer diameter of the box member 210. In this embodiment, the portion 185 is not necessary since the shoulder portion 190 is raised relative to the box member 210 due to the predetermined slope. In a further embodiment, the shoulder portion 190 is raised relative to other portions of the pin member 110. In this embodiment, the raised shoulder portion 190 is configured to substantially block or shield the vulnerable end of the box member 210 from contact with the surrounding wellbore as the tubular string is lowered into the wellbore.

FIG. 6 illustrates the threaded connection 150 in accordance with the present invention. For convenience, the components in FIG. 6 that are similar to the components in FIGS. 1 and 2 will be labeled with the same number indicator. As shown, the first tubular 100 includes a protrusion 265 formed therein proximate the pin member 110 and the second tubular includes a protrusion 270 formed therein proximate the box member 210. The protrusions 265, 270 provide a means to substantially prevent the surrounding wellbore from contacting and/or scratching an end of the box member 210 in a similar manner as set forth above. Although the threaded connection 150 in FIG. 6 shows the protrusion 265 and the protrusion 270, it should be understood, however, that the threaded connection 150 may include only the protrusion 265 or only the protrusion 270, without departing from principles of the present invention. In one embodiment, the protrusions 265, 270 may have a continuous circumferential shape around the tubular. In another embodiment, the protrusions 265, 270 may consist of a plurality of individual protrusions. This embodiment allows fluid flow to travel past the connection 150 between the individual protrusions.

FIG. 7 illustrates the threaded connection 150 in accordance with the present invention. For convenience, the components in FIG. 7 that are similar to the components in FIGS. 1 and 2 will be labeled with the same number indicator. As shown, the first tubular 100 includes a protrusion 240 formed therein proximate the pin member 110, and the second tubular 200 includes a raised portion 245 formed therein proximate the box member 210. The protrusion 240 and the raised portion provide a means to substantially prevent the surrounding wellbore from contacting and/or scratching an end of the box member 210 in a similar manner as set forth above. Although the threaded connection 150 in FIG. 7 shows both the protrusion 240 and the raised portion 245, it should be understood, however, that the threaded connection 150 may include only the protrusion 240 or only the raised portion 245, without departing from principles of the present invention. Further, the protrusion 240 may be formed on the second tubular 200 and/or the raised portion may be formed on the first tubular 100, without departing from principles of the present invention. In one embodiment, the protrusion 240 and/or the raised portion 245 may have a continuous circumferential shape around the tubular. In another embodiment, the protrusion 240 and/or the raised portion 245 may consist of a plurality of individual protrusions (or raised portions). This embodiment allows fluid flow to travel past the connection 150 between the individual protrusions (or raised portions).

FIG. 8 illustrates the threaded connection 150 with a ring member 275 in accordance with the present invention. For convenience, the components in FIG. 8 that are similar to the components in FIGS. 1 and 2 will be labeled with the same number indicator. As shown, the ring member 275 is disposed around the pin member 110. The ring member 275 is positioned proximate an end portion 205 of the box member 210 to substantially prevent the surrounding wellbore from contacting and/or scratching the end portion 205 of the box member 210. Generally, the ring member 275 is used to offset the connection 150 from the surrounding wellbore. In other words, the ring member 275 substantially blocks or shields the end portion 205 from contact with the surrounding wellbore as the tubular string is lowered into the wellbore. Additionally, the ring member 275 could be used as a torque ring.

FIG. 9 illustrates the threaded connection 150 in accordance with the present invention. For convenience, the components in FIG. 9 that are similar to the components in FIGS. 1 and 2 will be labeled with the same number indicator. As shown, the first tubular 100 includes a projection member 280 proximate the pin member 110 and the second tubular includes a projection member 285 proximate the box member 210. The projection members 280, 285 provide a means to substantially prevent the surrounding wellbore from contacting and/or scratching an end of the box member 210 in a similar manner as set forth above. The projection member 280, 285 may be made from any type of material that is durable yet capable of expanding, such as metal, elastomeric, plastic, or a polymeric. The projection member 280, 285 may also be a weld bead. In one embodiment, the projection member 280, 285 may have a continuous circumferential shape around the tubular. In another embodiment, the projection member 280, 285 may consist of a plurality of individual projection members. This embodiment allows fluid flow to travel past the connection 150 between the individual projection members.

Although the threaded connection 150 in FIG. 9 shows two projection members 280, 285, it should be understood, however, that the threaded connection 150 may include only the projection member 280 or only the projection member 285, without departing from principles of the present invention. Further, the threaded connection 150 may include any number of projection members without departing from principles of the present invention.

Although embodiments of the invention are described with reference to a box member, other types of tubular resembling a box member, such as a coupling, are also contemplated by the embodiments of the invention.

While the foregoing is directed to embodiments of the present invention, other and further embodiments of the invention may be devised without departing from the basic scope thereof, and the scope thereof is determined by the claims that follow.

The invention claimed is:

1. An expandable tubular connection for use in a wellbore, the tubular connection comprising:
   a tubular pin member;
   a tubular box member having an end portion, wherein the tubular pin member is matable with the tubular box member to form the tubular connection; and
   a sleeve member having at least one protrusion that has an outer diameter greater than an outer diameter of a first end portion and a second end portion, wherein the sleeve member has substantially the same thickness across the longitudinal length of the sleeve member, including at the end portions and the at least one protrusion, and wherein the sleeve member is configured to substantially prevent the end portion of the tubular box member from contacting the wellbore.

2. The tubular connection of claim 1, wherein the sleeve member includes a plurality of protrusions formed therein.

3. The tubular connection of claim 1, wherein the sleeve member includes a plurality of geometric shapes formed therein.

4. The tubular connection of claim 1, wherein the sleeve member includes a tab member to secure the sleeve member to the tubular pin member.

5. The tubular connection of claim 1, wherein the sleeve member is disposed on the tubular pin member or the tubular box member.

6. The tubular connection of claim 1, wherein a portion of the sleeve member is disposed on the tubular box member.

7. The tubular connection of claim 1, wherein a portion of the sleeve member is disposed on the tubular pin member.

8. The tubular connection of claim 1, wherein the sleeve member is positioned proximate the end portion of the tubular box member.

9. The tubular connection of claim 1, wherein the sleeve member includes at least one of a slot and a hole.

10. The tubular connection of claim 1, wherein the at least one protrusion has an arcuate shape.

11. The tubular connection of claim 1, wherein the sleeve member includes a plurality of protrusions spaced apart along a circumference of the sleeve member.

12. A method for utilizing a tubular connection in a wellbore, the method comprising:
    positioning a sleeve member on a tubular box member, wherein the sleeve member includes at least one protrusion that has an outer diameter greater than an outer diameter of an end portion, and wherein the sleeve member has substantially the same thickness across the longitudinal length of the sleeve member, including at the end portion and the at least one protrusion;
    connecting a tubular pin member with the tubular box member to provide the tubular connection;
    substantially blocking an end portion of the tubular box member from contact with the wellbore by utilizing the sleeve member as the tubular connection is lowered into the wellbore; and
    expanding the tubular connection.

13. The method of claim 12, wherein the sleeve member includes at least one geometric shape formed therein.

14. The method of claim 13, wherein the geometric shape is a slot or hole.

15. The method of claim 12, wherein the sleeve member includes a tab member to secure the sleeve member to the tubular connection.

16. The method of claim 12, wherein the sleeve member includes an elastomer layer disposed on an outer surface thereof.

17. The method of claim 12, further comprising attaching the sleeve member to the tubular box member using adhesive.

18. The method of claim 12, wherein the at least one protrusion has an arcuate shape.

19. The method of claim 12, wherein the sleeve member includes a plurality of protrusions spaced apart along a circumference of the sleeve member.

20. An expandable tubular connection for use in a wellbore, the tubular connection comprising:
   a tubular pin member;
   a tubular box member having an end portion, wherein the tubular pin member is matable with the tubular box member to form the tubular connection; and
   a sleeve member having a plurality of protrusions spaced apart along a circumference of the sleeve member, wherein each protrusion includes an inner diameter that is greater than an inner diameter of an end portion of the sleeve member and wherein the sleeve member is configured to substantially prevent the end portion of the tubular box member from contacting the wellbore.

21. The tubular connection of claim 20, wherein a portion of the sleeve member is disposed on the tubular box member.

22. The tubular connection of claim 20, wherein a portion of the sleeve member is disposed on the tubular pin member and the tubular box member.

23. The tubular connection of claim 20, wherein the sleeve member is positioned proximate the end portion of the tubular box member.

24. The tubular connection of claim 20, wherein a first end portion and a second end portion of the sleeve member have substantially the same outer diameter and inner diameter.

25. The tubular connection of claim 20, wherein a portion of the sleeve member is attached to the tubular box member by an adhesive.

26. The tubular connection of claim 20, wherein the sleeve member includes at least one of a slot and a hole.

\* \* \* \* \*